(12) United States Patent
Miesak

(10) Patent No.: US 9,128,356 B1
(45) Date of Patent: Sep. 8, 2015

(54) SYSTEM AND METHOD FOR PROVIDING A POLARIZATION PROJECTOR UTILIZING A POLARIZATION SENSITIVE LENS

(71) Applicant: LOCKHEED MARTIN CORPORATION, Bethesda, MD (US)

(72) Inventor: Edward J. Miesak, Windermere, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 9 days.

(21) Appl. No.: 14/208,050

(22) Filed: Mar. 13, 2014

Related U.S. Application Data

(60) Provisional application No. 61/806,736, filed on Mar. 29, 2013, provisional application No. 61/778,997, filed on Mar. 13, 2013.

(51) Int. Cl.
*G02F 1/1335* (2006.01)
*G03B 21/00* (2006.01)
*H04N 9/31* (2006.01)

(52) U.S. Cl.
CPC ............ *G03B 21/006* (2013.01); *H04N 9/3105* (2013.01); *H04N 9/3197* (2013.01)

(58) Field of Classification Search
CPC ........................ H04N 9/3197; H04N 9/3105
See application file for complete search history.

(56) References Cited

U.S. PATENT DOCUMENTS

| 4,859,994 | A | 8/1989 | Zola et al. |
| 5,793,470 | A | 8/1998 | Haseltine et al. |
| 5,868,480 | A | 2/1999 | Zeinali |
| 6,073,851 | A | 6/2000 | Olmstead et al. |
| 6,535,335 | B2 | 3/2003 | Patel et al. |
| 7,213,930 | B2 | 5/2007 | Quach |

(Continued)

FOREIGN PATENT DOCUMENTS

| JP | 2007084253 | 3/1995 |
| JP | 3045958 | 5/2000 |

(Continued)

OTHER PUBLICATIONS http://www.syracuse.com/entertainment/index.ssf/2013/06/closed_caption_glasses_movies_regal_theaters_deaf.html, Jun. 2013.

(Continued)

*Primary Examiner* — Phu Vu
(74) *Attorney, Agent, or Firm* — Terry M. Sanks, Esq.; Beusse Wolter Sanks & Maire, PLLC

(57) ABSTRACT

A system for projecting to a viewing surface including an illumination source to project a first image onto the viewing surface along a beam path, a focusing system to focus the first image, provided in a first polarization state and projected from the illumination source, at a first image plane along the beam path between the illumination source and the viewing surface, a transmissive LCD, through which the first image is transmitted, for placement in the beam path at the first image plane with the LCD further configured to propagate a second image, provided in a second polarization state, and a first polarized filter configured to provide the first image in the first polarization state before the first image is transmitted through the LCD. At least one of the first image and the second image is in a non-detectable polarization state when illuminated upon the viewing surface.

29 Claims, 8 Drawing Sheets

(56) References Cited

U.S. PATENT DOCUMENTS

| | | |
|---|---|---|
| 7,414,698 B2 | 8/2008 | Cashin et al. |
| 7,690,794 B2 | 4/2010 | Boothroyd |
| 8,506,085 B2 | 8/2013 | Azor et al. |
| 2007/0046898 A1 | 3/2007 | Conner |
| 2007/0139792 A1 | 6/2007 | Sayag |
| 2010/0039689 A1 | 2/2010 | Sayag |
| 2010/0085750 A1 | 4/2010 | Van Ostrand et al. |
| 2010/0289969 A1 | 11/2010 | Yamazaki et al. |
| 2013/0155352 A1 | 6/2013 | Wicker |

FOREIGN PATENT DOCUMENTS

| | | |
|---|---|---|
| JP | 2000250129 | 9/2000 |
| JP | 2008165077 | 7/2008 |
| JP | 2011081216 | 4/2011 |
| KR | 20000042136 | 7/2000 |
| KR | 20040058969 | 7/2004 |
| WO | 2012064520 | 5/2012 |
| WO | 2013040656 | 3/2013 |
| WO | 2013059228 | 4/2013 |

OTHER PUBLICATIONS

International Search Report (ISA/KR), Jul. 15, 2014.

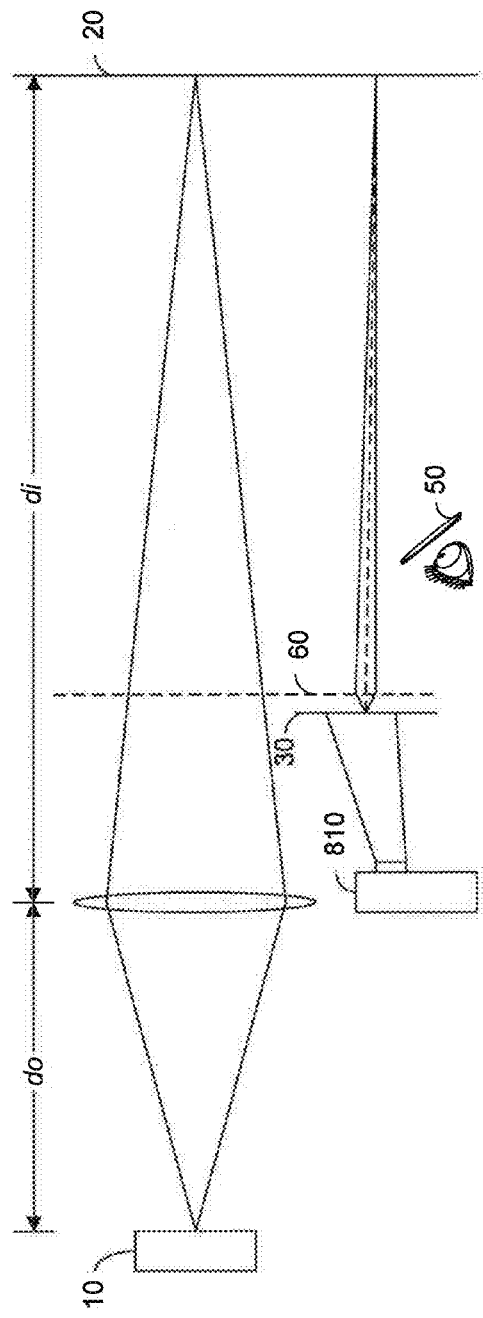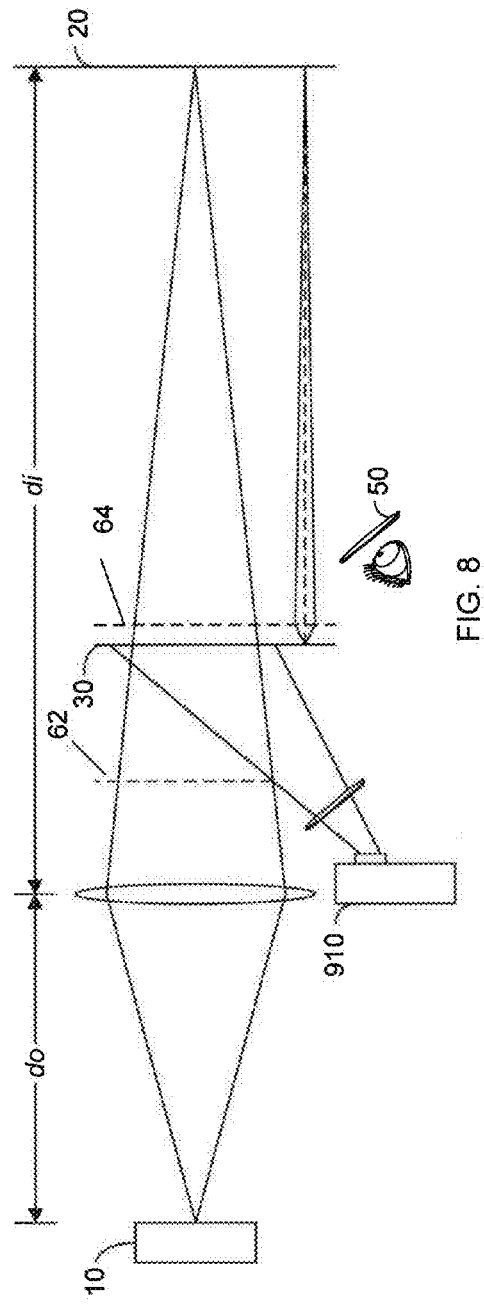

SYSTEM AND METHOD FOR PROVIDING A POLARIZATION PROJECTOR UTILIZING A POLARIZATION SENSITIVE LENS

CROSS-REFERENCE TO RELATED APPLICATIONS

This application claims the benefit of U.S. Provisional Application No. 61/806,736 filed Mar. 29, 2013, and U.S. Provisional Application No. 61/778,997 filed. Mar. 13, 2013, and both incorporated herein by reference in their respective entirety.

BACKGROUND

Embodiments relate to an imaging system and, more particularly, to a system and method to obtain a high spatial resolution of information that would not be normally available when viewing a projected image, but is viewable when appropriate eyewear is used.

Steganography is an art and science of writing hidden messages in such a way that no one, apart from a sender and an intended recipient, suspects the existence of the message. Other than applying steganography techniques to assist in detecting counterfeited legal tender, such techniques are generally not used in association with typical activities involving consumers.

For example, an approach using steganography to view closed caption information on a screen at a movie theater would be beneficial. Currently, there is no means to incorporate closed captioned information directly on a movie screen without other individuals viewing the movie seeing the closed captioned information. Glasses have been developed which use a receiver and transmitter to receive closed captioned information and then display it within the glasses for a wearer so that only the wearer sees the closed captioned information. These glasses with transmitters and receivers can be expensive to replace, repair and/or maintain. Other proposed approaches include using iPads®, tablets or cell phones to receive closed captioned information from the movie theater through Bluetooth® technology or a similar communication protocol, where the user could then watch the closed captioning on the device while watching the movie. Another tried option involved displaying the closed captioning on a back wall of the theater and watching the movie through a "window" at the user's seat. The window would reflect the closed captioning to the user. However, these approaches have tended not to be acceptable by the viewing public or by theater owners.

Because of the cost associated with having such glasses requiring transmitters and receivers, another approach is to encode the closed caption directly onto the movie, but making the closed caption only available to certain users, such as those wearing a particular type of glasses. One approach involved a use of an ordinary liquid crystal display ("LCD") between the projector and viewing screen. However, the resultant images were found to be blurry due primarily to diffraction, which is a result of shapes of pixels of the LCD, which are a smallest addressable element of the LCD, having sharp edges. Additionally, the LCD typically is not completely transparent as they usually comprise grids or black lines imparted on a surface of the LCD.

Thus, manufacturers, users and consumers would benefit from being able to be provided viewing content to a screen, such as, but not limited to, in a movie theater environment where the information is not readily visible to others, but through a form of steganography such information may be viewable by specific viewers where the information has clear resolution.

SUMMARY

Embodiments relate to a system, kit, and method for providing a high spatial resolution of information that would not be normally available when viewing a projected image, but is viewable when appropriate eyewear is used. The system may be provided for projecting to a viewing surface with the system comprising an illumination source configured to project a first image onto the viewing surface along a beam path. The system further includes a focusing system configured to focus the first image, provided in a first polarization state and projected from the illumination source, at a first image plane along the beam path between the illumination source and the viewing surface. The system further includes a transmissive liquid crystal display (LCD), through which the first image is transmitted, configured for placement in the beam path at the first image plane, the LCD further configured to propagate a second image, provided in a second polarization state. The system further comprises a first polarized filter configured to provide the first image in the first polarization state before the first image is transmitted through the LCD. The focusing system is further configured to focus the first image and the second image, illuminated from the LCD, at a second image plane. At least one of the first image in the first polarization state and the second image in the second polarization state is in a non-detectable polarization state when illuminated upon the viewing surface.

The kit is for use with an imaging device that projects a first image in a first polarization state onto a viewing surface. The kit comprises a transmissive liquid crystal display (LCD) configured to propagate a second image in a second polarization state into a beam path of the imaging device containing the first image when transmitted through the LCD, wherein an illumination light originating from the imaging device provides illumination light for both the first image and the second image and a focusing system configured to provide focus to the first image and the second on the viewing surface. At least one of the first image in the first polarization state and the second image in the second polarization state is in a non-detectable polarization state when illuminated upon the viewing surface.

A method comprises focusing a first image, provided in a first polarization state and projected from an imaging device, at a first image plane along a beam path between the imaging device and a viewing surface with a first focusing element. The method also comprises propagating a second image, provided in a second polarization state, along the beam path with a transmissive liquid crystal display (LCD), located in the beam path positioned at the first image plane. The method also comprises focusing the first image in the first polarization state and the second image in the second polarization state, both illuminated from the LCD, at a second image plane with a second focusing element, wherein at least one of the first image in the first polarization state and the second image in the second polarization state is in a non-detectable polarization state when illuminated at the second image plane.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 7 shows another representation of an embodiment of the system;

FIG. 8 shows another representation of an embodiment of the system;

DETAILED DESCRIPTION

Figure 1:
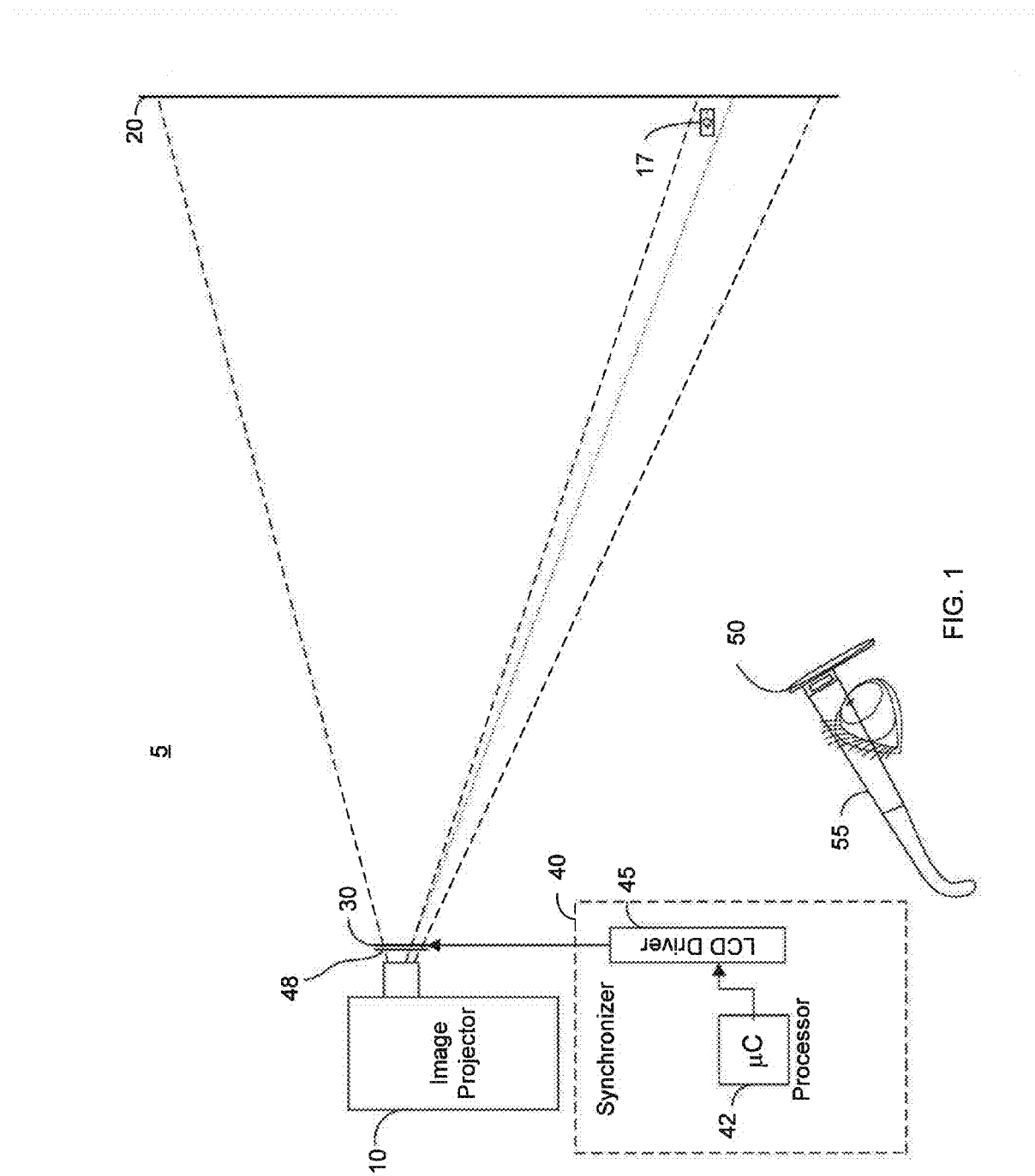
FIG. 1 shows a representation of an embodiment of a system.

Embodiments are described herein with reference to the attached figures, wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Humans are not sensitive to polarization. More specifically, humans are not capable of detecting multiple polarization states with their unaided eyes. Light polarized in a horizontal or vertical direction appear the same to a human, but may appear different if wearing polarized glasses. Furthermore, if light making up a portion of an image is polarized orthogonally to a transmission polarization of the glasses, then that portion of the image will be attenuated and the viewer will perceive that portion as dark. Therefore, though a human may be able to see in a first polarization state, they likely are not able to see in a second polarization state without a device to aid with visualization, such as, but not limited to, polarization glasses. The inventor has discovered a way to utilize polarization to provide for images, such as, but not limited to, closed caption text, to be imaged on a projected image where only viewers wearing polarized glasses would be able to view both images.

FIG. 1 shows a representation of an embodiment of a system. Though not necessarily parts of the system 5, an image projector 10, imaging device or illumination source, and a screen or viewing surface 20 are disclosed. The term "image projector," "illumination source" or "imaging device" is used to include any system or device which projects or provides illumination for projecting an image, content, information, etc., along a beam path for viewing at another location, such as, but not limited to, a viewing surface 20. The image projector 10 may be a still-image projector, video projector, and/or an illumination component of a projection system. Thus, these terms are not provided to be limiting to a particular system or device. Furthermore, these terms may be used interchangeably.

The image, information or content provided from the illumination source 10 to the screen 20 may be considered a first image and may be in a first polarization state so that the content on the screen 20 may be visible or viewable without an eye being aided by some other device, such as, but not limited to, polarization glasses. As such, the terms "illumination" and "projection," including other verb tenses of these terms, may be used interchangeably as neither term is meant to be limiting with respect to the other.

The screen 20 may have a polarization preserving surface so that the polarization states of the first image illuminated from the illumination source 10 or the second image originated from LCD 30, but utilizing illumination from the illumination source 10, is not altered or changed while projected upon the screen 20.

The system 5 comprises an encoder or a liquid crystal display ("LCD") 30. The term "encoder" is used to define a device, subsystem, or element that provides for allowing an image in a second polarization state to be combined, or encoded with, the first image in the first polarization state at the encoder where further propagation of both images is accomplished with an illuminated light provided with the source of the first image, or the image projector 10. In an embodiment, the LCD may simply be considered an encoder 30. The LCD works by polarization rotation, but other polarization rotators exist that do not use liquid crystal display technology. The encoder 30 may be a polarization rotator an optical device that rotates the polarization axis of a polarized light source by an angle of choice. Rotation may be, but is not limited to, being based on a principle of birefringence or multiple reflections. Polarization may be rotated using reflections or phase retardation due to a material birefringence. Reflections may be accomplished using mirrors, or surfaces resembling mirrors, and phase retardation due to birefringence can be accomplished with materials such as sucrose, sapphire, swamp water, and many more. However, these materials are not very practical to make an encoder. A polarization image encoder may be created using a material that can be optically manipulated rather than electrically manipulated such as a common LCD. For modulation, the LCD rotates the polarization of light passing through it on a pixel by pixel basis. The LCD encodes, propagates, places, injects, etc., the closed caption image, provided from the LCD via a synchronizer discussed in further detail below, onto the first image that is projected through it. Therefore the terms encoder and LCD are not to be limiting and may be used interchangeably herein as both are used to describe a device which provides for polarization rotation.

Furthermore, a common LCD has lines, typically black lines, on its surface. More specifically, the common LCD is not clear like a window pane. Thus, a non-limiting example of the type of LCD used herein is a clear LCD, such as ones designed for watch faces (having clarity of a window pane) and other specialty uses.

The terms "first polarization state" and "second polarization state" are not meant to be limiting. Thus, though the discussion herein suggests that the image in the polarization state is viewable by a human without an unaided eye and the second polarization state is only viewable by a human with a device to aid the eye, these positions may be switched. Thus, the first polarization state may be the state where aid is needed for the human eye to view an image and the second polarization state may be the state where no aid for the human eye is needed. Likewise, the use of the terms "first image" and "second image" are not meant to be limiting as the primary image may actually be the second image and the information provided to be "hidden" or in a non-viewable polarization state without an aid, may be the first image.

The LCD 30 may rotate the image polarization from the illumination source 10 up to an orthogonal state, ninety degrees if linear or opposite handedness, right to left, or left to right, if circular or elliptical. The LCD 30 propagates or provides additional information, content, or a second image, in a second polarization state onto the first image which is illuminated from the illumination source 10 and viewed on the screen 20. The LCD 30 may be located in a line of sight, or beam path, from the illumination source 10 to the screen 20. Thus, the content emitted from the LCD 30 may not be visible or viewable on the screen 20 without the eye of the user being aided by some other device.

A first polarized filter 48 may be provided to ensure that the content illuminated from the illumination source 10 has a same polarization of a first polarization state. The polarized filter 48 may be provided along the beam path between the image projector 10 and the LCD 30. In another embodiment, the first polarized filter 48 may be a part of the LCD 30 on a side facing the image projector 10. As other non-limiting examples, the first polarized filter 48 may be a part of a focusing system 60 (later disclosed herein) which is located with the LCD 30 after the illumination source 10, a part of the illumination source 10, etc. As a non-limiting example, the illumination source 10 may have the polarized 48 filter as a part of the illumination source 10. Thus, the first polarized filter 48 may not be necessary as sufficient polarization may be available with the illumination source 10. As another non-limiting example, the first polarized filter 48 may improve a quality of the polarization experienced by the projected image prior to reaching the screen 20 and thus may still be included as an independent component or as part of the encoder 30. When included, the first polarized filter 48 may reduce a brightness of the image 225 generated by the illumination source 10, but only by a negligible amount.

A synchronizer 40 may be provided to synchronize the content from the LCD 30 with the content from the illumination source 10. The synchronizer may also comprise a processor 42 configured to synchronize data to be illuminated in the second polarization state with the image being illuminated in the first polarization state. An LCD driver 45 may be provided to control the LCD by providing the electronics to display the data in the second polarization state onto the transmissive material of the LCD 30. Thus, the second image may be produced so that it synchs, coincides, or aligns, with the first image being viewed.

Non-limiting examples of the second image may comprise, but is not limited to, subtitles, closed caption, any image or information which may be words, symbols, or alpha numeric characters, images, video, data, etc. Thus, if the first image contains characters speaking in a movie, the second image may contain text of what is being said where the synchronizer 40 ensures that the text is presented on the screen 20 at the same time the words are spoken by the characters. A location of the second image in correspondence with the first image is not limited as it may be located anywhere within or adjacent to the first image. As a non-limiting example, the second image may be provided as pop-up balloons, much like how text is illustrated in a comic book. When one of the images is in a polarization state that is not viewable by an unaided human eye, it may be considered hidden.

A second polarized filter 50 may be provided so that when the screen 20 is viewed through it, both the first image and the second image are viewable. The second polarized filter 50, which may be configured to have a different orientation or a same orientation or line of sight to the screen 20 when compared to the LCD 30, is also provided. In other words, the path from the second polarized filter 50 to the screen may be the same or different than the beam path of the image projector 10 to the screen 20. In an embodiment, the second polarized filter 50 may be located along a second line of sight to the screen 20. As a non-limiting example, the second polarized filter 50 may be located in front of an eye of a user, such as, but not limited to, as wearable eyewear 55 or a piece of eyewear. Non-limiting examples of eyewear 55 may include, but are not limited to, a pair of sun glasses, clear polarized glasses (eyewear), a head wearable display ("HWD") device which may be a part of a head mounted display ("HMD") system, etc. Thus, the eyewear 55 simply holds the second polarized filter and no other components are needed on the eyewear, or to assist the human eye, to view image in the polarization state which is not visible to the human without some form of an aid. If used in a movie theater, the cost of a patron leaving with any theater-provided eyewear 55 is negligible financially.

By locating the second polarized filter 50 along the second line of sight, such as, but not limited to, in front of an eye, or eyes of the user, the user may be able to view the hidden, or non-discernible, image 245 (see FIG. 2) whereas other viewers not using the second polarized filter 50 will not see the hidden image 245. The first line of sight and the second line of sight as discussed above may not be mutually exclusive of each other. More specifically, both lines of sight may intersect before the screen 20 is reached.

Though the described system in FIG. 1 provides the first image in the first polarization state and the second image in the second polarization state where the illumination light is generated from a single source, specifically the image projector 10, the pixels illuminated on the screen 20 may be blurred, as represented by element 17 which identifies a blurred pixel. Thus, a focusing system may be provided to focus the images to eliminate blurriness.

Figure 2:
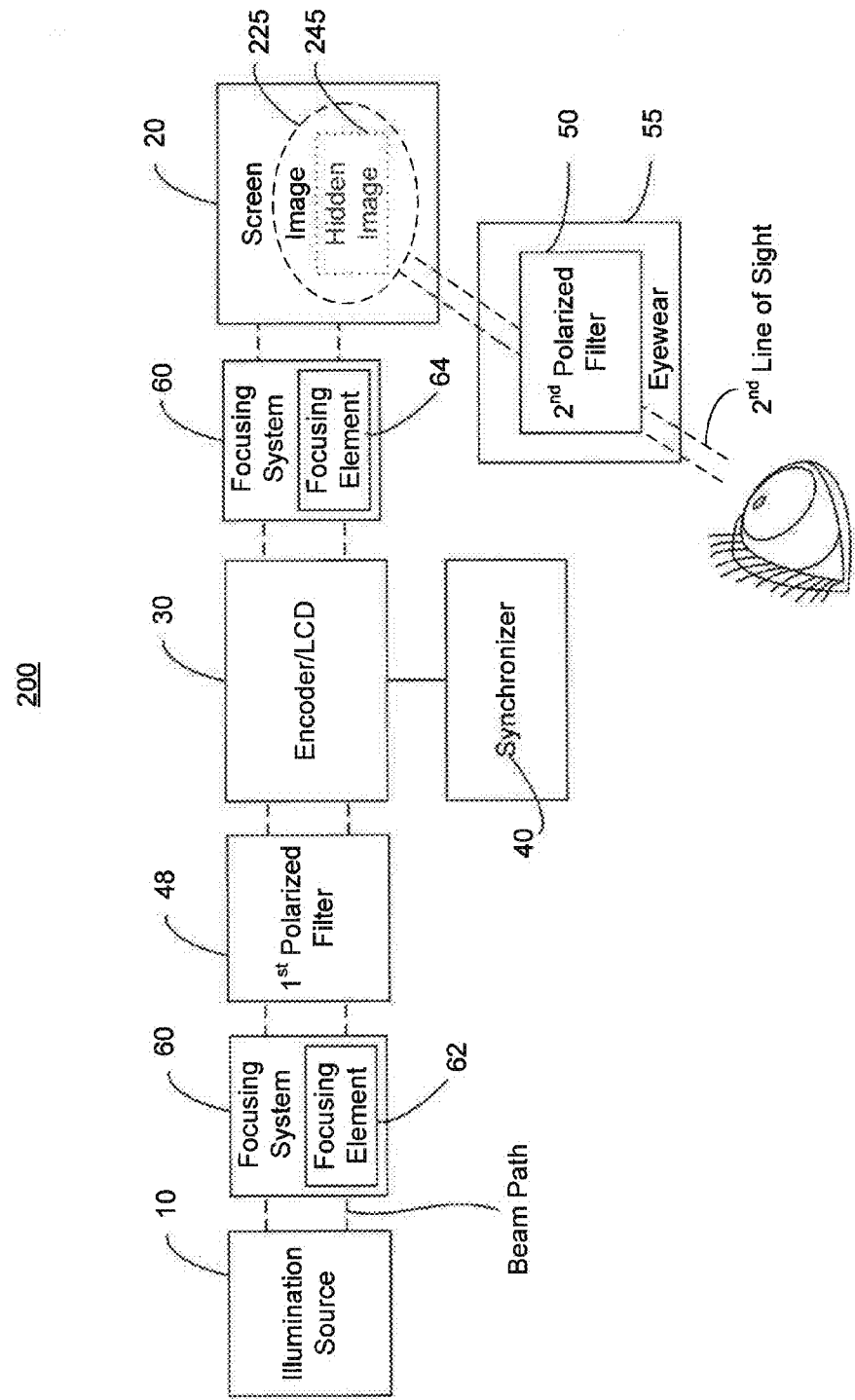
FIG. 2 shows a schematic illustrating an embodiment of a projection system using a polarization encoded projector.

FIG. 2 shows a block diagram illustrating an embodiment of the system. A beam path exists from the illumination source 10 to the viewable surface 20. The encoder 30 may be located within the beam path between the illumination source and the viewing surface 20. The first polarized filter 48 may be provided and may be located on the side of the LCD 30 closest to the image projector 10 or in between the LCD 30 and the image projector 10. The second polarized filter 50 may be provided and may be located along a second line of sight to the screen 20. The first image 225 is viewable by an unaided human eye. When both images are viewed through the second polarized filter 50 when on the screen 20, the second image 245 is made visible by the second polarized filter whereas the first image is still also visible through the second polarizer as it was visible even without the second polarized filter 50. The second polarizer filter 50 causes darkening or changing of colors of specific areas of the first image at the screen 20 to create the second image by contrast.

A focusing system 60 or subsystem may be provided to focus the pixel when viewed on the screen 20. A plurality of focusing systems may be utilized. In an embodiment, the focusing system 60 may be configured to focus a first image, provided in the first polarization state and projected from the image projector, at a first image plane along a beam path between the image projection system and the viewing surface. The first image plane is where the LCD 30 is positioned. The focusing system 60 may be further configured to focus the first image and the second image, created by the LCD 30, at a second image plane. The second image plane may be where the screen is located. Thus, as illustrated, the focusing system 60 may comprise a first focusing element to focus the first image at the first image plane, and a second focusing element to focus the first image and the second image at the second image plane.

More specifically, the illumination source 10 may project the first image 225, in a first polarization state which may be visible to the unaided human eye, onto the viewing area or screen 20. The image 225 may pass through the encoder 30, which may comprise the first polarized filter and the focusing system 60 prior to being viewed on the screen 20. The focusing system 60 and the encoder 30 are also located along the beam path of the illumination from the image projector 10 to the screen 20. A part of the focusing system 60 may also be provided to focus the first image and the second image when viewed on the screen 20. In an embodiment, the focusing system 60 comprises a first focusing element 62 which is configured to focus the first image at a first image plane, which is the location of the encoder 30, and a second focusing element 64 which is configured to focus the first and second image at a second image plane, which may be the location of the screen 20.

The second focusing element 64 may be provided to further focus the second image 245 on the screen 20. The second focusing element 64 may be designed to operate only at a specific polarization state of the hidden image 245 passing through the focusing element 64. Light of any other polarization state, such as that coming from the illumination source 10, may not be impacted by the polarization sensitive lens of this focusing element 64. The lenses of either focusing element 62, 64 may also be non-polarization sensitive whereas they may operate on any and all polarization states.

The first focusing element 62 and the second focusing element 64 may be flat transparent substrates with no optical power at a first polarization state. It may not alter any polarization state of the projection. The first polarized filter 48 and the encoder 30 may also be flat transparent substrates with no optical power. By being transparent, these elements are transmissive. This way the first polarized filter 48, encoder 30, first focusing element 62, and second focusing element 64 may be placed in the path of a video or still image projector or illumination source 10, which provides illumination, to the screen 20 and not impact the optical quality of the material or information being projected from the illumination source 10.

Figure 3:
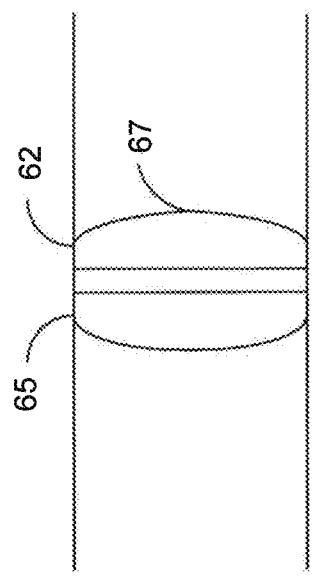
FIG. 3 shows an embodiment of a focus element.

FIG. 3 shows a schematic illustration of an embodiment of a focusing element of the focusing system. The focusing system may comprise a first lens element located in the beam path between the image projector 10 and the LCD 30 and a second lens element 64 located in the beam path between the LCD 30 and the screen 20. Either one or both of the lens elements may comprise achromatically corrected lenses of multiple elements. As illustrated, though not limiting as other configurations are possible, two achromatically corrected lenses 65, 67 are shown, with their "flatter" sides adjacent to each other. These lenses are typically curved on both surfaces, but one side will be curved more than the other. The illustration in FIG. 4 is provided simply to illustrate that the flatter sides are adjacent and is not provide to suggest a flat completely flat side for these lenses.

Figure 4:
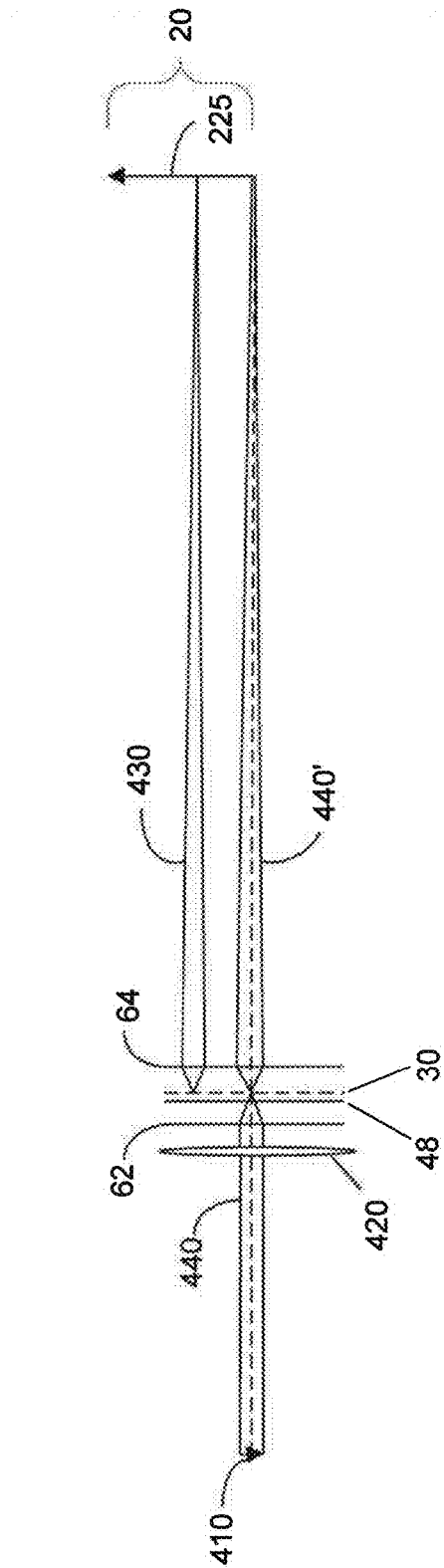
FIG. 4 shows another representation of an embodiment of the system with respect to focusing the images with a focusing system.

FIG. 4 shows a schematic illustrating an embodiment of the system using a polarization as described herein with respect to focusing the images. The system 5 comprises the illumination source 10 depicted as a projection system represented by a projector object 410 and the projection lens 420. The corresponding illuminated image 225, initiated from the illumination source 10, appears on the screen 20. If not a part of the LCD 30, the first polarized filter 48 may be located at a convenient location after the projection lens 420. As a non-limiting example, the first polarized filter 48 may even be designed to clip onto an outside region of a casing holding the projection lens 420. As another non-limiting example and as discussed previously, since many illumination sources comprise a lens with a polarized filter, the first polarized filter 48 may not be needed. The first polarized filter 48 may be clear, transparent, and featureless, much like a piece of clear window pane. Thus, the first polarized filter 48 may be configured not to degrade the first image 225 in the first polarization state that is eventually projected onto the screen 20. As discussed above, the encoder 30, or LCD, may inject, propagate or provide, additional information (as used herein the hidden image 245 or second image) into the light beam comprising the image 225 and then onto the screen 20.

Each focusing element 62, 64 of the focusing system 60 may reconstruct the image from the projector object 410 to the first focus plane which is where the LCD 30 is positioned and from the LCD 30 to the second focus plane, which is where the screen may be located based on the following thin lens equation in its Gaussian form:

$$\frac{1}{f} = \frac{1}{do} + \frac{1}{di}$$

where do is a distance between an object and a lens, di is a distance between the corresponding image and the lens, and f stands for a focal length of the lens. When using the respective focusing elements, having lenses to focus the additional content the size of the additional content provided by the encoder 30 may be based on the equation as follows:

$$M = \frac{-di}{do} = \frac{h'}{-h}$$

where M is for magnification, h' is the image height on the image 225 on the screen 20 and h is the image height within the LCD 30.

Though the focusing elements in one embodiment are disclosed with two lenses they may also consist of a compliment of any number of lenses (even a single lens) making up a complex lens system such as a telephoto lens. Using a telephoto lens allows more control over the magnification of the second or hidden image 245 on the screen 20. The lens system may allow the second image to be projected without being inverted either horizontally or vertically. More specifically, a compliment of lenses and reflective elements working together can be designed to not invert the final image and to also control the magnification of the hidden image on the screen. A single lens may possibly invert the image both vertically and horizontally. In other embodiments, it may also be possible to use an array of single lenses or an array of telephoto lenses to image the encoder onto the screen. Each lens of the array would image one element of the encoder.

As discussed above, a viewer or user will not see the hidden image 245 since it has a polarization state that is not detectable to a human eye, unless the viewer is looking at the screen 20 through a second polarized filter 50 which is orientated to "de-code" the polarization encoded hidden image. Thus, the hidden image 245 may be brought into focus or provided visual clarity on the movie screen 20 by adjusting the focal length of the focusing element 64 or by adjusting its distance from the encoder 30. Determining clarity or focus may be assisted by viewing the hidden image 245 through a second polarized filter 50.

Thus, an illuminated image 440 (represented as a ray trace) passes through the focusing element 62 and is focused at the first focus plane which is where the LCD 30 is located. The illuminated image 440' then passes through the LCD 30 and then through the second focusing element 64, which focuses the illuminated image 440' at the second focus plane, which is where the screen 20 may be located. The second image 430 (represented as a ray trace) originates from the LCD 30 and is passed through the second focusing element 64, which focuses the illuminated second image 430 at the second focus plane, which is where the screen may be located.

Figure 5:
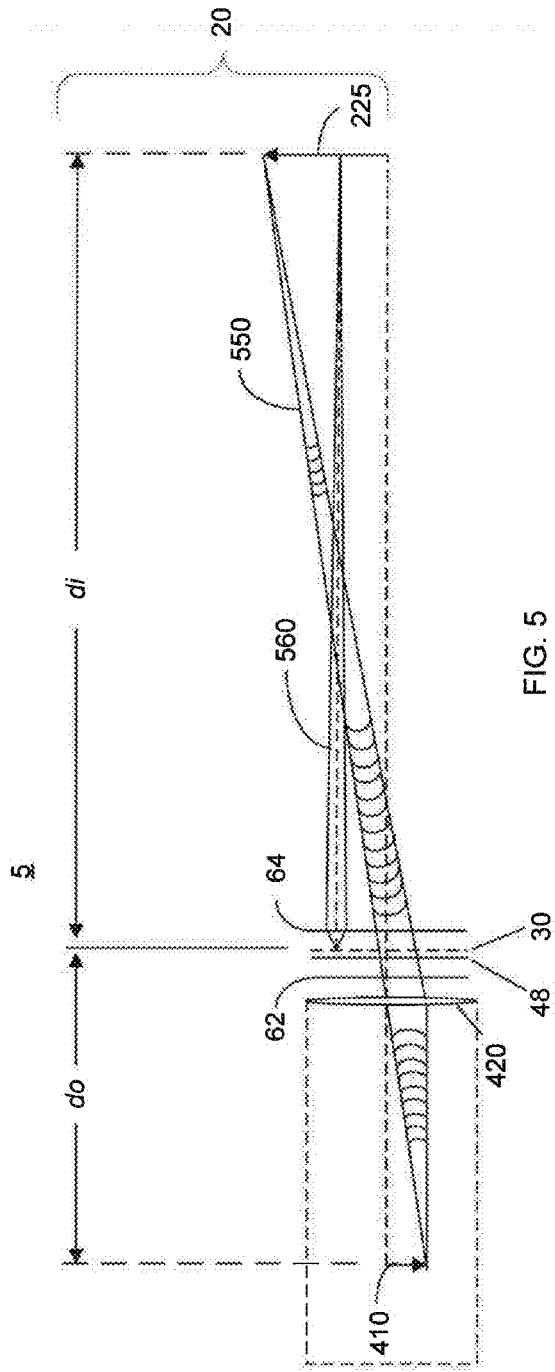
FIG. 5 shows another representation of an embodiment of the system with respect to focusing the images as disclosed in FIG. 4.

FIG. 5 shows another schematic illustrating an embodiment of the system using a polarization encoded projector system as described herein. Light passing from the illumination source 10 may have optical rays originating from a certain location of the illumination source 10 which are represented by a wavefront 550 within a ray trace shaped as illustrated. A wavefront is usually approximated using sections taken from circles where their origins are located at critical locations, in this case the screen 20. The wavefront 550 may not be distorted as it passes from the image projector 10 to the screen 20 where the rays of the wavefront 550 are not deviated by anything in their path from the projector lens to the screen 20. Thus, the wavefront shape generated by the illumination source 10 is not degraded, but it is focused by the focusing elements. More specifically, modifying the polarization state of this wavefront 550 such as, but not limited to, passing it through the focusing system 60 or LCD 30 as disclosed herein, even at multiple locations, does not necessarily change the shape of this wavefront 550.

A representation 560 of the second, or non-detectable, image 245 as a ray trace is also disclosed. As illustrated, it originates from the encoder 30, passes through the second focusing element 64, and then terminates on the screen 20. The second focusing element 64 is used to provide clarity of the first image 225 and the second image 245 when they are viewed through the second polarized filter 50.

Any obstructions, optical deviations, optical imperfections that are in the optical path from the illumination source 10 to the screen 20 that do inadvertently impact the light intensity wavefront 550 will impart diffraction onto the light, i.e., the imperfections may distort the shape of the wavefront 550. The closer the optical imperfection is to the projection lens 420, the worse the diffraction may be on the movie screen 20. Diffraction in this scenario manifests itself as an image blur.

If the blur is bad enough, the feature causing it will not be visible on the movie screen 20. Therefore, when the LCD 30, and/or focusing system 60 is mounted close to the projection lens 420 of the illumination source 10, any imperfections in the LCD 30 and/or focusing system 60 will not be visible by the viewer. However, the encoder 30, and/or the focusing system 60 may be mounted far from the projection lens 320 as well.

Figure 6:
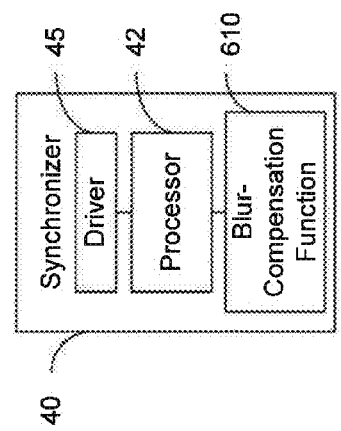
FIG. 6 shows another representation of an embodiment of the focusing system.

FIG. 6 shows another embodiment of the system. As illustrated, instead of the focusing system 60 comprising focusing elements 62, 64 which comprise lenses, the focusing system 60 may comprise a non-transitory processor readable storage medium which provides for an executable computer program product that has an executable computer program product that may comprise a computer software code that, when executed, may control the processor 40 within the synchronizer to apply a blur compensation function to correct any blur. In other words, a blur-compensation function 610 is provided within the synchronizer 40 and functions with the processor 42 to correct for blur associated with either the first image and/or the second image. The LCD driver 45 is also shown which is used to control placement of the second image onto the LCD 30.

As explained further herein, the encoder 30 may provide the second image as a hidden, or non-detectable, image 245 which is imparted on the image 225 that originates from the illumination source 10. The non-detectable image 245 is in a polarization state not discernible by the unaided human eye whereas the image 225 generated by the illumination source 10 is not altered or degraded at all when viewed by the unaided human eye. As disclosed in further detail in FIGS. 7 and 8, a second illumination source 810, 910 may feed or provide the non-viewable image 245 to the encoder 30 or directly to the screen 20. However, such systems require an additional component, namely, the second illumination source.

FIG. 7 shows another representation of an embodiment of the system. In this embodiment of the system 5, the encoder 30 is not in the first line of sight, or beam path, of the illumination source 10 to the screen 20. Instead it is in a third line of sight from the encoder 30 to the screen 20. A second illumination source 810 is provided to illuminate the hidden or second image 245. A focusing system 60 may be provided after the encoder 30. The polarized filter 50 may be in the second line of sight to the screen 20. Though not illustrated, the encoder 30 may be connected to the illumination source 10 through the synchronizer to ensure that the non-visible content contained in the hidden image 245 is synched with the visible content contained in the image 225 originated from the illumination source as both are displayed on the screen 20.

FIG. 8 shows another representation of an embodiment of the system. A projector 910, such as, but not limited to, a digital micro-mirror device to provide for digital light processing, may be used to illuminate an image onto the encoder 30. In a non-limiting example, the projector 910 may illuminate in an ultraviolet spectrum onto the encoder 30. As non-limiting examples, the projector 810 may be a pico-projector, mobile projector, mini beamer, etc. A projector lens 920 may be provided to image ultraviolet ("UV") light onto the encoder 30. The light that illuminates the LCD 30 causes the liquid crystal material to rotate the polarization of the light passing through it, namely the light from the image projector 10. An ordinary LCD does this electrically. The LCD 30 disclosed herein is being modulated not by electricity but by the UV light hitting it. Thus, such an LCD 30 is effectively one big LCD pixel. The visible light passing through the LCD 30 then has its polarization rotated by the liquid crystal material. The UV image is then projected through the LCD 30, the focusing system 60 to provide the second focal plane at the screen 20. The focusing system 60 may work in only a single polarization state or all polarization states. In another embodiment, the focusing system comprises the first focusing element 62 and the second focusing element 64. The second focusing element 64 is provided after the encoder 30 to provide the second focusing plane at the screen 20 and is in the beam path for both projectors 10, 810. The first focusing element 62 may be provided between a lens of the first projector 10 to provide for the first focusing plane at the location where the encoder 30 is located. The polarized filter 50 is provided along the second line of sight to the screen 20.

Figure 9:
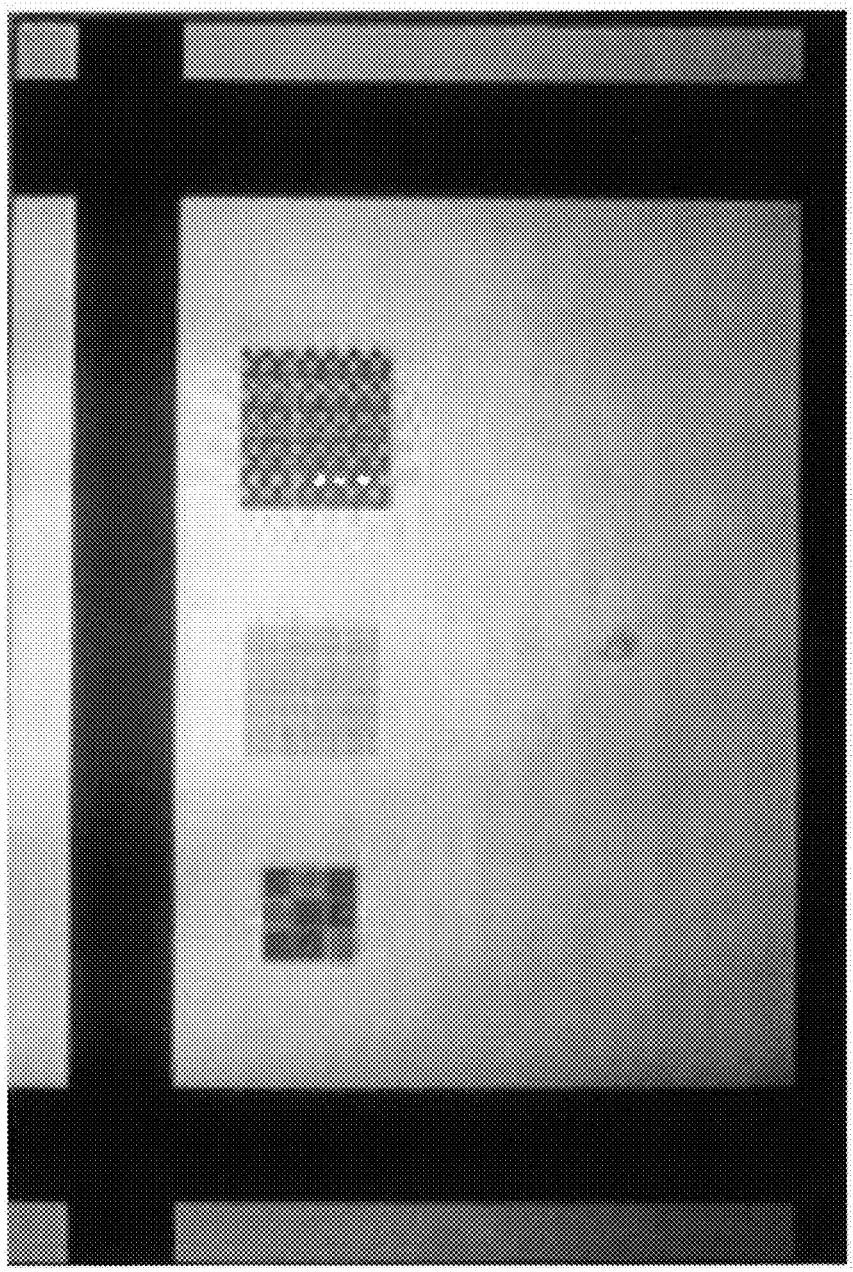
FIG. 9 shows a pictorial representation of a test pattern.

FIG. 9 shows a pictorial representation of a test pattern. This test pattern was projected through the encoder 30 of the system 5 illustrated in FIG. 2 onto the screen 20. As illustrated, no distortion of the test pattern was present. As is further illustrated, any dimming associated with having passed through the encoder 30 is minimized.

Figure 10:
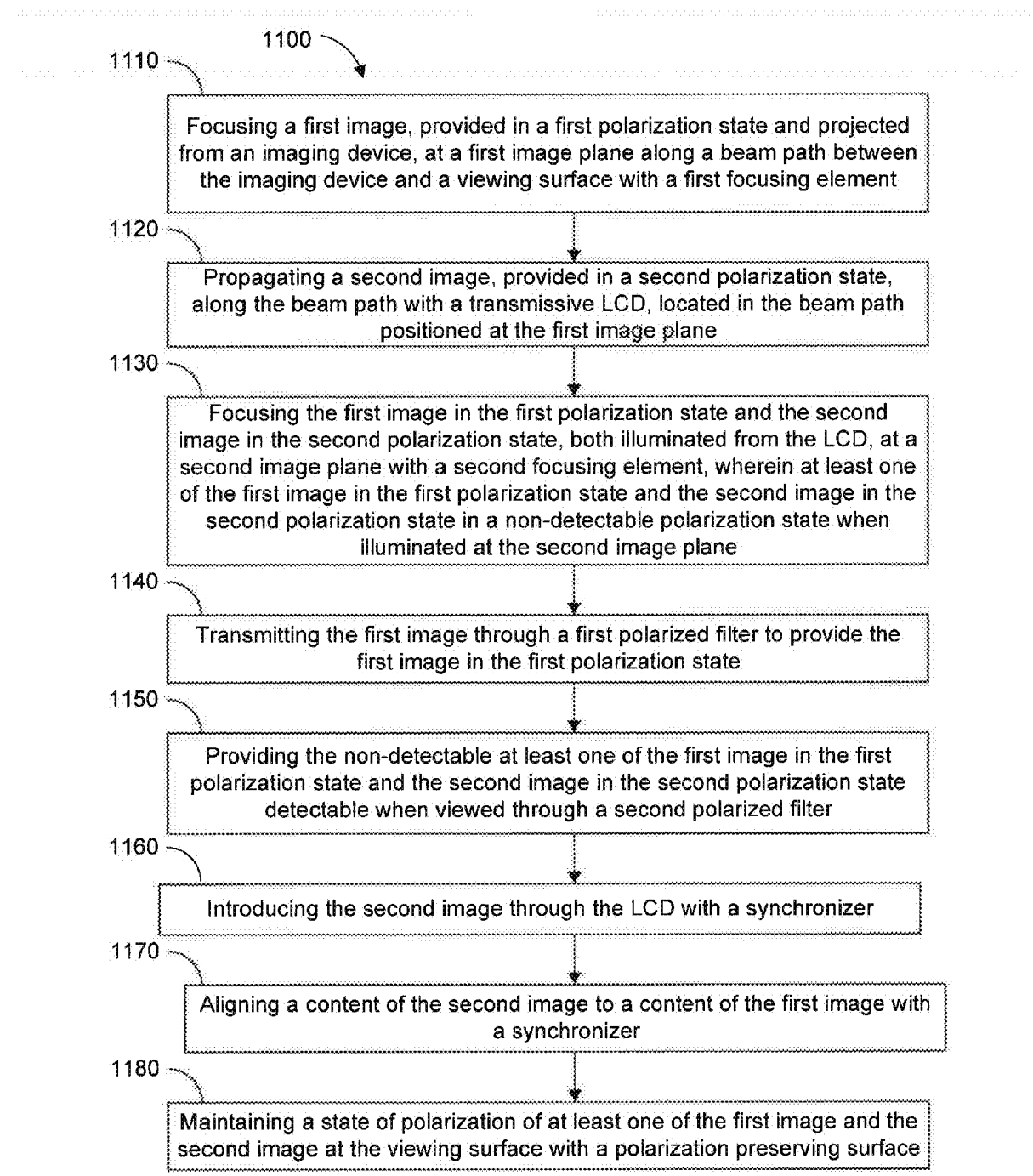
FIG. 10 shows an embodiment of a flowchart illustrating a method.

FIG. 10 shows an embodiment of a flowchart illustrating a method utilizing aspects of the system. The method 1100 comprises focusing, a first image provided in a first polarization state and projected from an image projector, at a first image plane along a beam path between the image projection system and a viewing surface with a first focusing element, at 1110. The method 1100 further comprises propagating a second image, provided in a second polarization state, along the beam path with a transmissive LCD panel, located in the beam path positioned at the first image plane, at 1120. The method 1100 further comprises focusing the first image in the first polarization state and the second image in the second polarization state, both illuminated from the LCD panel, at a second image plane with a second focusing element, wherein at least one of the first image in the first polarization state and the second image in the second polarization state is in a non-detectable polarization state when illuminated at the second image plane, at 1130. As disclosed above, the viewing surface is located at the second image plane.

The method 1100 may further comprise transmitting the first image through a first polarized filter to provide the first image in the first polarization state, at 1140. The method 1100 may further comprise providing the non-detectable at least one of the first image in the first polarization state and the second image in the second polarization state detectable when viewed through a second polarized filter, at 1150. The method 1100 may further comprise introducing the second image through the LCD panel with a synchronizer, at 1160. The method 1100 may further comprise aligning a content of the second image to a content of the first image with a synchronizer, at 1170. The method 1100 may further comprise maintaining a state of polarization of at least one of the first image and the second image at the viewing surface with a polarization preserving surface, at 1180. Propagating the second image, at 1120, may further comprise propagating the second image with an illumination light from the image projection system. Though the steps illustrated above are provided in a particular sequence, this sequence is not meant to be limiting as those skilled in the art will recognize that these steps may be performed in any particular order.

Thus, as disclosed, the system may be provided for projecting, such as an image, to a viewing surface. The system may comprise an illumination source configured to project a first image onto the viewing surface along a beam path. The system may further comprise a focusing system configured to focus the first image, provided in a first polarization state and projected from the illumination source, at a first image plane along the beam path between the illumination source and the viewing surface. The system may also comprise a transmissive liquid crystal display (LCD), through which the first image is transmitted, configured for placement in the beam path at the first image plane, the LCD further configured to propagate a second image, provided in a second polarization state. The system also comprises a first polarized filter configured to provide the first image in the first polarization state before the first image is transmitted through the LCD. The focusing system is further configured to focus the first image and the second image, illuminated from the LCD, at a second image plane. At least one of the first image in the first polarization state and the second image in the second polarization state is in a non-detectable polarization state when illuminated upon the viewing surface. Thus, when viewing the viewing surface without the second polarized filter, only one of the images is viewable. However, when viewing the viewing surface through the second polarized filter, both the first image and the second image are viewable.

In another embodiment, an embodiment of the system may be provided as a kit which may be used with an imaging device that projects a first image in a first polarization state onto a viewing surface. The kit may comprise a transmissive liquid crystal display (LCD) configured to propagate a second image in a second polarization state into a beam path of the imaging device containing the first image when transmitted through the LCD, wherein an illumination light originating from the imaging device provides illumination light for both the first image and the second image a focusing system configured to provide focus to the first image and the second on the viewing surface. At least one of the first image in the first polarization state and the second image in the second polarization state is in a non-detectable polarization state when illuminated upon the viewing surface.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Thus, while embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

The invention claimed is:

1. A system for projecting to a viewing surface, the system comprising:
an illumination source configured to project a first image onto the viewing surface along a beam path;
a focusing system configured to focus the first image, provided in a first polarization state and projected from the illumination source, at a first image plane along the beam path between the illumination source and the viewing surface;
a transmissive liquid crystal display (LCD), through which the first image is transmitted, configured for placement in the beam path at the first image plane, the LCD further configured to propagate a second image, provided in a second polarization state; and
a first polarized filter configured to provide the first image in the first polarization state before the first image is transmitted through the LCD;
wherein the focusing system is further configured to focus the first image and the second image, illuminated from the LCD, at a second image plane; and
wherein at least one of the first image in the first polarization state and the second image in the second polarization state is in a non-detectable polarization state when illuminated upon the viewing surface.

2. The system according to claim 1, further comprising a second polarized filter configured to cause the non-detectable at least one of the first image in the first polarization state and the second image in the second polarization state to be detectable when viewed through the second polarized filter.

3. The system according to claim 1, further comprising a synchronizer configured to introduce the second image upon the LCD.

4. The system according to claim 3, wherein the synchronizer is further configured to align a content of the second image with a content of the first image.

5. The system according to claim 4, wherein the LCD is further configured to modulate the first polarization state of the first image with the first polarized filter.

6. The system according to claim 1, further comprising the viewing surface located at the second image plane.

7. The system according to claim 6, wherein the viewing surface comprises a polarization preserving surface.

8. The system according to claim 1, wherein the focusing system comprises a first lens system located in the beam path between the illumination source and the LCD and a second lens system located in the beam path between the LCD and the second image plane.

9. The system according to claim 8, wherein at least one of the first lens system and the second lens system comprises a plurality of achromatically corrected lenses.

10. The system according to claim 1, wherein the LCD is configured to propagate the second image into the beam path with use of an illumination light of the illumination source.

11. A kit for use with an imaging device that projects a first image in a first polarization state onto a viewing surface, the kit comprising:
a transmissive liquid crystal display (LCD) configured to propagate a second image in a second polarization state into a beam path of the imaging device containing the first image when transmitted through the LCD, wherein an illumination light originating from the imaging device provides illumination light for both the first image and the second image; and
a focusing system configured to provide focus to the first image and the second image on the viewing surface;
wherein at least one of the first image in the first polarization state and the second image in the second polarization state is in a non-detectable polarization state when illuminated upon the viewing surface.

12. The kit according to claim 11, wherein the transmissive LCD further comprises a first polarized filter configured to provide for propagation of the first image in the first polarization state.

13. The kit according to claim 11, further comprising a second polarized filter configured to cause the non-detectable at least one of the first image in the first polarization state and the second image in the second polarization state to be detectable when viewed through the second polarized filter.

14. The kit according to claim 11, further comprising a synchronizer configured to introduce the second image upon the LCD.

15. The kit according to claim 14, wherein the synchronizer is further configured to align a content of the second image with a content of the first image.

16. The kit according to claim 11, wherein the focusing system comprises a first lens element located in the beam path between the imaging device and the LCD and a second lens element located in the beam path after LCD.

17. The kit according to claim 16, wherein at least one of the first lens element and the second lens element comprises a plurality of achromatically corrected lenses.

18. The kit according to claim 11, wherein the focusing system is configured to focus the first image projected from the imaging device at a first image plane along the beam path between the imaging device and the LCD.

19. The kit according to claim 18, wherein the LCD is located at the first image plane.

20. The kit according to claim 18, wherein the focusing system is configured to focus the first image and the second image, illuminated from the LCD, at a second image plane.

21. The kit according to claim 11, wherein the viewing surface is located at the second image plane.

22. A method comprising:
focusing a first image, provided in a first polarization state and projected from an imaging device, at a first image plane along a beam path between the imaging device and a viewing surface with a first focusing element;
propagating a second image, provided in a second polarization state, along the beam path with a transmissive liquid crystal display (LCD), located in the beam path positioned at the first image plane; and
focusing the first image in the first polarization state and the second image in the second polarization state, both illuminated from the LCD, at a second image plane with a second focusing element, wherein at least one of the first image in the first polarization state and the second image in the second polarization state is in a non-detectable polarization state when illuminated at the second image plane.

23. The method according to claim 22, wherein the viewing surface is located at the second image plane.

24. The method according to claim 22, further comprising transmitting the first image through a first polarized filter to provide the first image in the first polarization state.

25. The method according to claim 22, further comprising providing the non-detectable at least one of the first image in the first polarization state and the second image in the second polarization state in a detectable polarization state when viewed through a second polarized filter.

26. The method according to claim 22, further comprising introducing the second image through the LCD with a synchronizer.

27. The method according to claim 22, further comprising aligning a content of the second image to a content of the first image with a synchronizer.

28. The method according to claim 22, further comprising maintaining a state of polarization of at least one of the first image and the second image at the viewing surface with a polarization preserving surface.

29. The method according to claim 22, wherein propagating the second image further comprises propagating the second image with an illumination light from the image projection system.

\* \* \* \* \*